United States Patent
Kimura et al.

(10) Patent No.: US 10,185,070 B2
(45) Date of Patent: Jan. 22, 2019

(54) DISPLAY DEVICE AND LIGHT SOURCE DEVICE

(71) Applicant: Japan Display Inc., Minato-ku (JP)

(72) Inventors: Susumu Kimura, Tokyo (JP); Tsutomu Harada, Tokyo (JP); Akira Sakaigawa, Tokyo (JP)

(73) Assignee: Japan Display Inc., Minato-ku (JP)

( * ) Notice: Subject to any disclaimer, the term of this patent is extended or adjusted under 35 U.S.C. 154(b) by 158 days.

(21) Appl. No.: 15/283,789

(22) Filed: Oct. 3, 2016

(65) Prior Publication Data
US 2017/0097458 A1    Apr. 6, 2017

(30) Foreign Application Priority Data

Oct. 5, 2015    (JP) ................................. 2015-197381

(51) Int. Cl.
*F21V 8/00*    (2006.01)
*G02F 1/1335*    (2006.01)

(52) U.S. Cl.
CPC .........  *G02B 6/0026* (2013.01); *G02B 6/0068* (2013.01); *G02F 1/133514* (2013.01); *G02F 1/133603* (2013.01); *G02F 2001/133614* (2013.01); *G02F 2001/133624* (2013.01)

(58) Field of Classification Search
CPC ................ G02B 6/0026; G02B 6/0068; G02F 1/133514; G02F 1/33603; G02F 2001/133614; G02F 2001/133624

USPC ......................................................... 362/608
See application file for complete search history.

(56) References Cited

U.S. PATENT DOCUMENTS

| | | | |
|---|---|---|---|
| 2014/0104874 A1* | 4/2014 | Park .................. | C09K 11/0883 362/608 |
| 2015/0219311 A1* | 8/2015 | Cho ...................... | G02B 6/0065 362/608 |
| 2016/0062023 A1* | 3/2016 | Itoh ....................... | G02B 6/0068 362/608 |

FOREIGN PATENT DOCUMENTS

JP    2013-115353    6/2013

* cited by examiner

*Primary Examiner* — Laura Tso
(74) *Attorney, Agent, or Firm* — Oblon, McClelland, Maier & Neustadt, L.L.P.

(57) ABSTRACT

According to one embodiment, a light source device includes a light source element including a first light emitting element which emits light of a first wavelength and a second light emitting element which emits light of a second wavelength, a first wavelength conversion material which is excited by the light from the first light emitting element to emit light of a third wavelength, and a second wavelength conversion material which is excited by the light from the second light emitting element to emit light of a fourth wavelength, wherein cyan light produced by the light emission of the first light emitting element and magenta light produced by the light emission of the second light emitting element are emitted from the same light emitting surface.

14 Claims, 10 Drawing Sheets

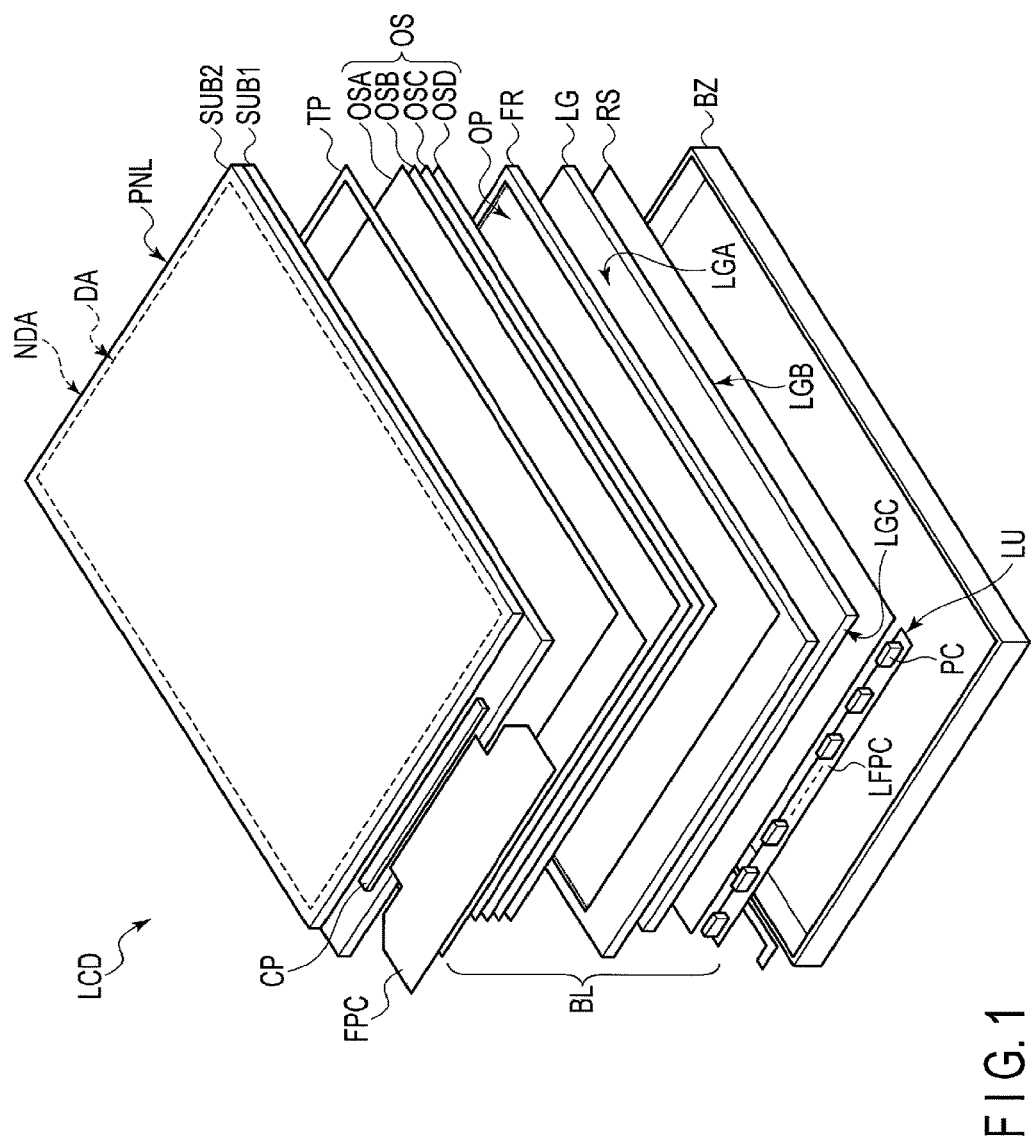
F I G. 1

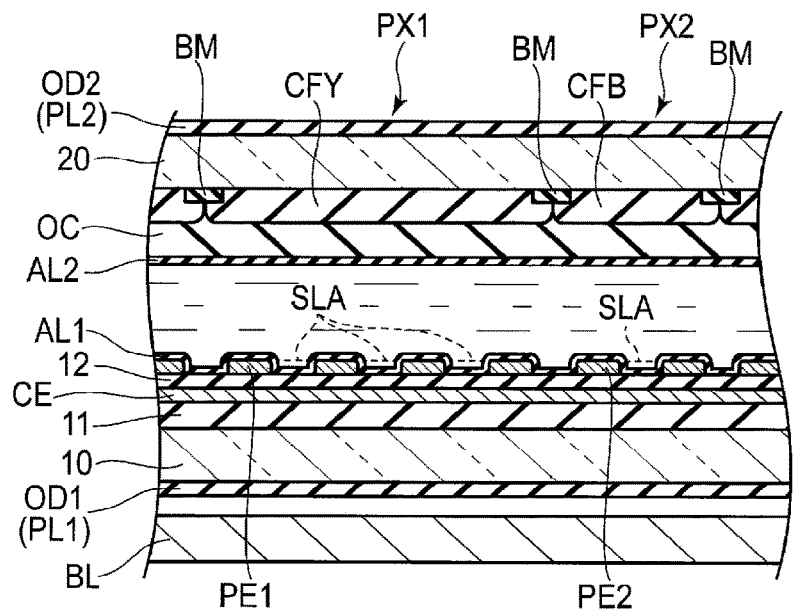
F I G. 3
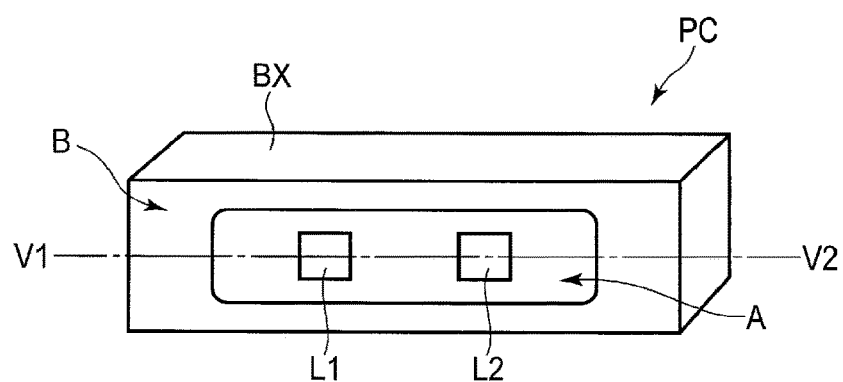
F I G. 4

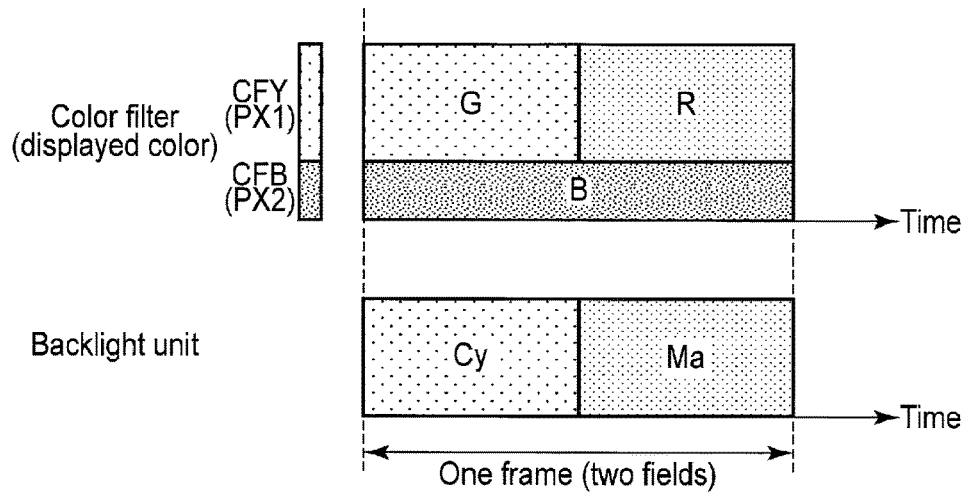
F I G. 7
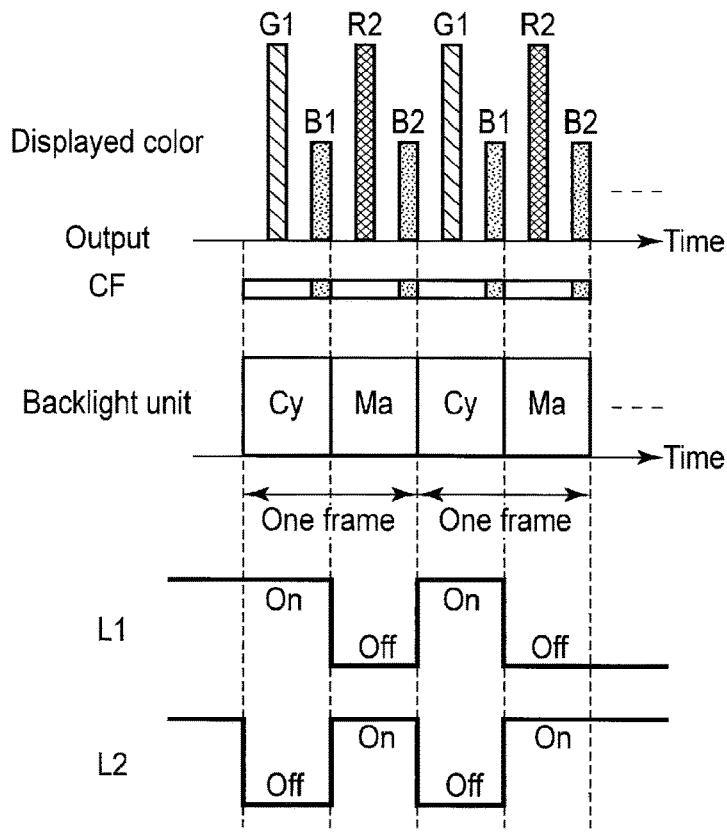
F I G. 8

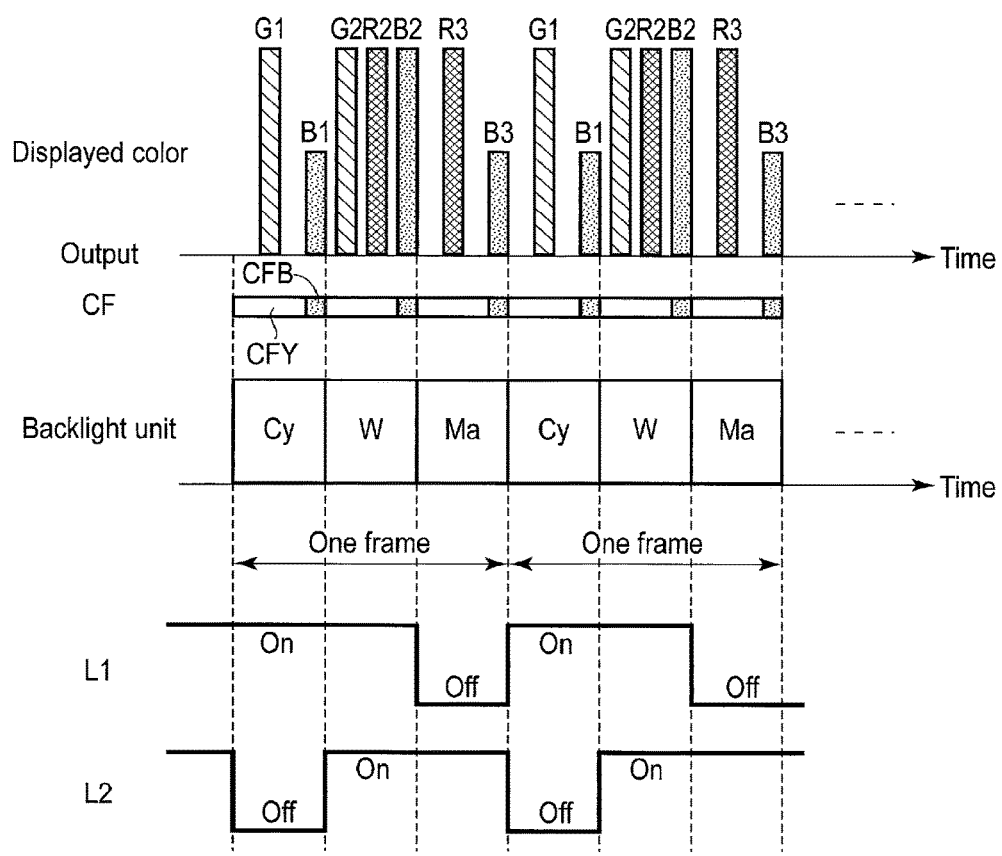
F I G. 11

DISPLAY DEVICE AND LIGHT SOURCE DEVICE

CROSS-REFERENCE TO RELATED APPLICATIONS

This application is based upon and claims the benefit of priority from Japanese Patent Application No. 2015-197381, filed Oct. 5, 2015, the entire contents of which are incorporated herein by reference.

FIELD

Embodiments described herein relate generally to a display device and a light source device.

BACKGROUND

Mobile devices are commercially used. Mobile devices such as smartphones, personal assistant devices, and tablet computers have a highly sophisticated display function. The mobile devices can display a color image. As a method used to display a color image, field sequential drive is known. In this drive method, a single frame period is divided into, for example, three periods of a red display period, green display period, and blue display period (or may be referred to as three fields). Corresponding to the three fields, pixels selected for red display, pixels selected for green display, and pixels selected for blue display are driven.

On the other hand, as a white light source applicable to display devices such as liquid crystal display devices, there is a light emitting device including a blue light emitting diode which emits blue light, ultraviolet light emitting diode which emits ultraviolet light, red phosphor which is excited by the ultraviolet light emitted from the lower surface of the ultraviolet light emitting diode to emit red light, and green phosphor which is excited by the ultraviolet light emitted from the upper surface of the ultraviolet light emitting diode. In such a light emitting device, the blue light emitting diode and the ultraviolet light emitting diode are electrically connected to maintain the balance of the mixture of red light from the red phosphor, green light from the green phosphor, and blue light from the blue light emitting diode. In such a light emitting device which essentially emits white light, the blue light emitting diode and the ultraviolet light emitting diode must emit the light at the same time, and it may cause excessive power consumption.

As another white light source, there is a light emitting device including a red light emitting diode, green light emitting diode, and blue light emitting diode arranged linearly, in which the light from two or more light emitting diodes is mixed in a lightguide plate. However, in such a device, the light does not mix sufficiently in the proximity of the incident surface of the lightguide plate and the color may become vague. Such vague color will deteriorate the display quality of the display device.

BRIEF DESCRIPTION OF THE DRAWINGS

FIG. 1 is a perspective view showing an example of the structure of a display device LCD in a disassembled manner.

FIG. 3 is a cross-sectional view of the display panel including a yellow subpixel and a blue subpixel.

FIG. 4 shows the structure of a light source element PC of FIG. 1.

FIG. 7 shows a relationship between the color of light from a backlight unit BL and colors of light from color filters CFY and CFB in a pixel.

FIG. 8 shows an example of drive of the first light emitting element L1 and the second light emitting element L2 and the color displayed by the display device.

FIG. 11 shows another example of drive of the first light emitting element L1 and the second light emitting element L2 and the color displayed by the display device.

DETAILED DESCRIPTION

Figure 2:
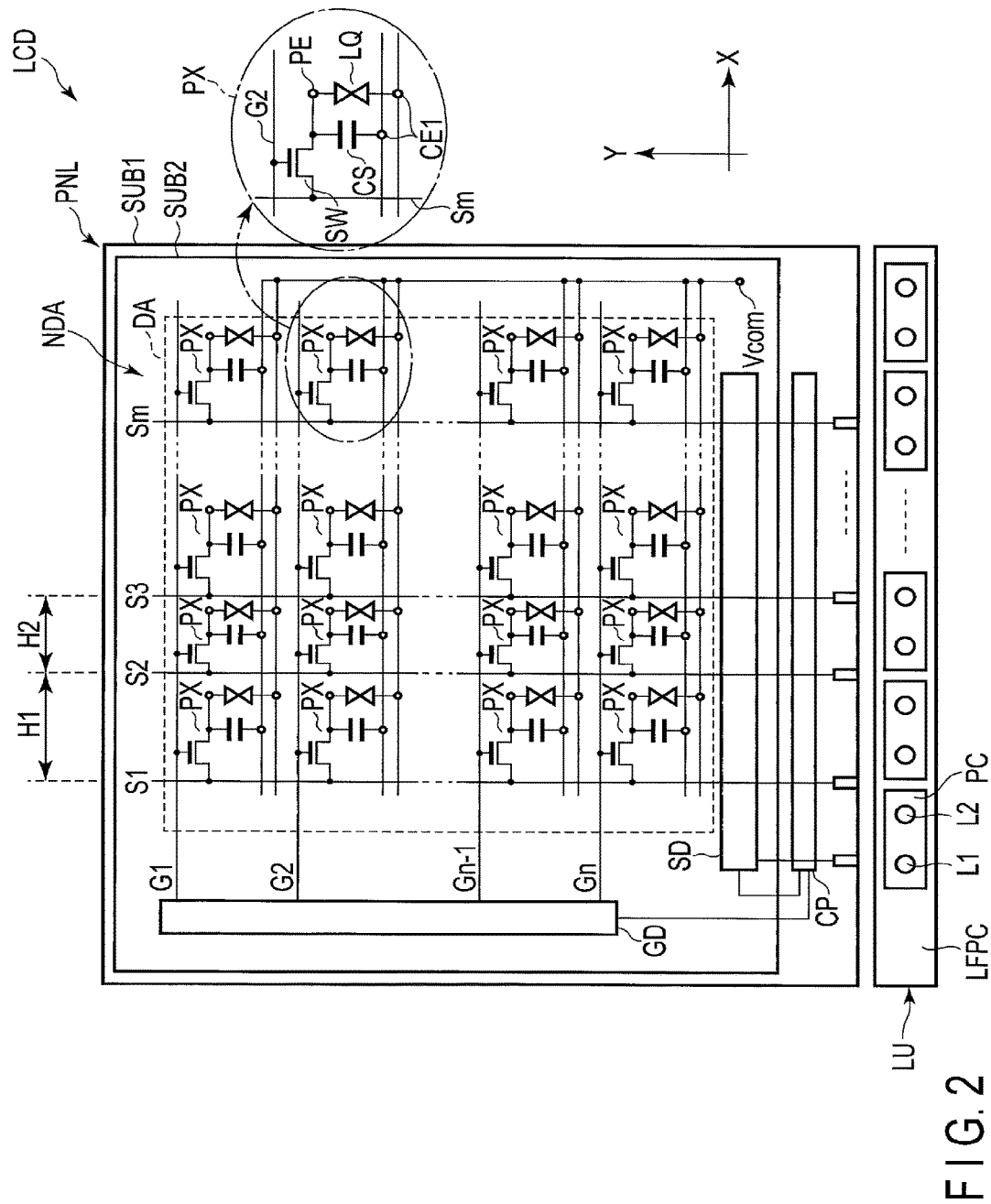
FIG. 2 shows an example of the structure of the display panel PNL and an example of an equivalent circuit therein.

In general, according to one embodiment, a light source device includes a light source element including a first light emitting element which emits light of a first wavelength and a second light emitting element which emits light of a second wavelength, a first wavelength conversion material which is excited by the light from the first light emitting element to emit light of a third wavelength and, a second wavelength conversion material which is excited by the light from the second light emitting element to emit light of a fourth wavelength, wherein cyan light produced by the light emission of the first light emitting element and magenta light produced by the light emission of the second light emitting element are emitted from the same light emitting surface.

According to one embodiment, a display device includes a display panel, a light source element including a first light emitting element which emits light of a first wavelength and a second light emitting element which emits light of a second wavelength, a lightguide plate including an incident surface which is opposed to the light source element and an exit surface which is opposed to the display panel, a first wavelength conversion material which is excited by the light from the first light emitting element to emit light of a third wavelength, and a second wavelength conversion material which is excited by the light from the second light emitting element to emit light of a fourth wavelength, wherein cyan light produced by the light emission of the first light emitting element and magenta light produced by the light emission of the second light emitting element are emitted from the same light emitting surface to illuminate the display panel.

According to one embodiment, a light source device includes a light source element including a first light emitting element which emits light of a first wavelength and a second light emitting element which emits light of a second wavelength, a first wavelength conversion material which is excited by the light from the first light emitting element to emit light of a third wavelength, and a second wavelength conversion material which is excited by the light from the second light emitting element to emit light of a fourth wavelength, wherein light of a first color including at least the light of the third wavelength which is produced by the light emission of the first light emitting element and light of a second color including at least the light of the fourth wavelength which is produced by the light emission of the second light emitting element are emitted from the same light emitting surface.

Embodiments will be described hereinafter with reference to the accompanying drawings. Incidentally, the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc. of the respective parts are schematically illustrated in the drawings, compared to the actual modes. However, the schematic illustration is merely an example, and adds no restrictions to the interpretation of the invention. Besides, in the specification and drawings, the structural elements having functions, which are identical or similar to the functions of the structural elements described in connection with preceding drawings, are denoted by like reference numerals, and an overlapping detailed description is omitted unless necessary.

FIG. 1 is a perspective view showing an example of the structure of a display device LCD in a disassembled manner. In this example, a liquid crystal display device will be exemplified as the display device LCD. Such a display device can be used in various devices such as a smartphone, tablet, feature phone, personal computer, television, in-car device, and game console.

The display device LCD includes, for example, a display panel PNL, double-sided tape TP, backlight unit BL, and bezel BZ. The backlight unit BL is disposed to be opposed to a first substrate SUB1 of the display panel PNL. The bezel BZ accommodates the display panel PNL and the backlight unit BL.

The display panel PNL includes a flat-panel first substrate SUB1, flat-panel second substrate SUB2 which is opposed to the first substrate SUB1, and liquid crystal layer (which is not shown) held between the first substrate SUB1 and the second substrate SUB2. The first substrate SUB1 and the second substrate SUB2 are adhered together by a sealant (which is not shown) with a certain cell gap formed therebetween. The liquid crystal layer is sealed within the area defined by the first substrate SUB1, second substrate SUB2, and the sealant. A driver IC chip and a flexible printed circuit FPC are mounted on the first substrate SUB1 as a signal supplier which supplies signals required to drive the display panel PNL.

The display panel PNL includes a display area DA in the area where the first substrate SUB1 and the second substrate SUB2 are opposed to each other. In the example depicted, a display area DA is formed in a rectangular shape. The display panel PNL includes a non-display area NDA of rectangular frame shape outside the display area DA. The display panel PNL of the present embodiment is, for example, a transparent display type which displays an image using a transparent display function which selectively passes the light from the backlight unit BL, or a transflective display type which displays an image using both the transparent display function and a reflective display function which selectively reflects external light or auxiliary light thereon.

In the example depicted, the backlight unit BL includes an optical sheet OS, frame FR, lightguide plate LG, light source unit LU, and reflective sheet RS.

The optical sheet OS is light transmissive and is disposed to be opposed to the first substrate SUB1 of the display panel PNL. The optical sheet OS includes a diffusion sheet OSA, prism sheet OSB, prism sheet OSC, and diffusion sheet OSD as a part of the backlight unit BL. In the example depicted, the elements in the optical sheet OS are formed in a rectangular shape to be opposed to the display area DA. Note that the number of diffusion sheets and prism sheets and the layering structure thereof in the optical sheet OS are optional and are not limited to the example of FIG. 1.

The frame FR is disposed between the display panel PNL and the bezel BZ. In the example depicted, the frame FR is formed in a rectangular shape and has a rectangular opening OP in the area opposed to the display area DA. Note that the shape of the frame FR is optional and is not limited to the example of FIG. 1. Furthermore, if the frame FR is structurally unnecessary, it may be omitted.

The double-sided tape TP is disposed between the display panel PNL and the frame FR. The double-sided tape TP adheres the display panel PNL and the frame FR together while being opposed to the non-display area NDA of the display panel PNL. The double-sided tape TP is formed in a rectangular shape and is, for example, light-shielding. Note that, if the display panel PNL and the frame FR are fixable without the aid of double-sided tape TP, the double-sided tape TP may be omitted.

The lightguide plate LG is disposed between the frame FR and the bezel BZ. The lightguide plate LG is formed as a flat plate. The lightguide plate LG includes a main surface LGA which is opposed to the frame FR, main surface LGB which is opposite to the main surface LGA, and side surface LGC connecting the main surfaces LGA and LGB.

The light source unit LU is arranged along the side surface LGC of the lightguide plate LG. The light source unit LU includes, for example, a plurality of light source elements PC and a flexible printed circuit LFPC on which the light source elements PC are mounted. A light source element PC is packaged light emitting elements which will be described later, and has an exit surface opposed to the side surface LGC of the lightguide plate LG. In this example, the light source elements PC are arranged along the side surface LGC to be parallel to a short side of the lightguide plate LG; however, they may be arranged along the side surface LGC to be parallel to a long side of the lightguide plate LG.

The reflective sheet RS is light reflective, and is disposed between the lightguide plate LG and bezel BZ. In the example depicted, the reflective sheet RS is formed in a rectangular shape and is opposed to the main surface LGB.

In the present embodiment, the light source device which illuminates the display panel PNL is a backlight unit formed in combination with the transmissive display panel PNL; however, it may be a frontlight unit formed in combination with a reflective display panel PNL. Furthermore, in the lightguide plate LG, the side surface LGC opposed to the light source elements PC corresponds to an incident surface and the main surface LGA opposed to the display panel PNL corresponds to an exit surface.

FIG. 2 shows an example of the structure of the display panel PNL and an example of the equivalent circuit therein.

The display device LCD includes an active matrix display panel PNL. The display area DA is composed of a plurality of subpixels PX arranged in a matrix. In the display area DA, subpixels PX arranged in the first direction X form rows, and subpixels PX arranged in the second direction Y form columns.

Note that, in the present application, a single subpixel PX includes a single color filter and represents a single color. A pixel which is a minimum unit for a color image display is a combination of several subpixels including different color filters. A pixel may be a combination of subpixels of yellow and blue color filters or may be a combination of subpixels of yellow, blue, and white color filters.

The first substrate SUB1 includes, in the display area DA, a plurality of gate lines G (G1 to Gn) arranged in the second direction Y, a plurality of source lines S (S1 to Sm) arranged in the first direction X, switching elements SW electrically connected to a gate line G and source line S in each subpixel PX, and pixel electrodes PE electrically connected to a switching element SW in each subpixel PX. The common electrode CE is provided with at least one of the first substrate SUB1 and the second substrate SUB2. The common electrode CE is provided with the entirety of the display area DA and is formed in common with the subpixels PX. The common electrode CE is drawn to the non-display area NDA to be connected to a power supply unit Vcom. A constant common voltage is supplied to the power supply unit Vcom. A storage capacitance CS is formed, for example, between the common electrode CE and the pixel electrode PE.

Although detailed explanation of the display device PNL is omitted, when a display mode which uses a vertical field produced orthoganally to the substrate main surface, namely, twisted nematic (TN) mode, optically compensated bend (OCB) mode, and vertical aligned (VA) mode is used, and when a display mode which uses an inclined field with respect to the substrate main surface is used, the pixel electrodes PE are formed on the first substrate SUB1 while the common electrode CE is formed on the second substrate SUB2. Or, when a display mode which uses a horizontal field produced horizontally to the substrate main surface, namely, an in-plane switching mode (IPS) which uses a horizontal field along the substrate main surface, or a fringe field switching (FFS) mode which is a kind of the IPS mode is used, both the pixel electrodes PE and the common electrode CE are formed on the first substrate SUB1. Furthermore, the display panel PNL may be configured to conform to a display mode of an arbitrary combination of the vertical field, horizontal field, and inclined field.

Each gate line G is drawn outside the display area DA to be connected to a gate driver GD. Each source line S is drawn outside the display area DA to be connected to a source driver SD. The gate driver GD and the source driver SD are at least partly formed on the first substrate SUB1 to be electrically connected to a driver IC chip CP.

The driver IC chip CP includes a controller of the gate driver GD and the source driver SD, which functions as a signal supplier configured to supply signals necessary for the drive of the display panel PNL. In the example depicted, the driver IC chip CP is mounted on the first substrate SUB1 in the non-display area NDA of the display panel PNL.

Color filters are arranged in a regular order to correspond to the subpixels PX. In the present embodiment, the subpixels PX in one line have the same width in the first direction X and have the color filters of the same color. In this example, subpixels PX arranged in the first line between source lines S1 and S2 have the yellow color filters. Subpixels PX arranged in the second line between source lines S2 and S3 have the blue color filters. The lines of yellow subpixels (first subpixels) PX and the lines of blue subpixels (second subpixels) PX are arranged alternately. Furthermore, a yellow color filter has a width H1 which is twice width H2 of a blue color filter. Note that, the subpixels PX have substantially the same length in the second direction Y. That is, in subpixels PX, the area substantially used for the image display is greater in the first subpixels than the second subpixels.

The light source unit LU includes a plurality of light source elements PC on the flexible printed circuit LFPC extending in the first direction X. The light source elements PC are periodically arranged in line in the first direction X. A light source element PC includes a first light emitting element L1 and a second light emitting element L2. In each light source element PC, the first light emitting element L1 and the second light emitting element L2 are arranged side-by-side in the first direction X, for example.

FIG. 3 is a cross-sectional view of the display panel PNL including a yellow subpixel and a blue subpixel. In this example, only the main structure of the display panel driven in the FFS mode will be explained. Hereinafter, the yellow subpixel will be referred to as the first subpixel PX1, and the blue subpixel will be referred to as the second subpixel PX2.

The first substrate SUB1 includes a transparent first insulating substrate 10 which is formed of a glass substrate or a resin substrate. The first substrate SUB1 includes, on the surface of the first insulating substrate 10 opposed to the second substrate SUB2, common electrode CE, pixel electrodes PE1 and PE2, first insulating film 11, second insulating film 12, and first alignment film AL1. The common electrode CE is formed on the first insulating film 11 extending over the first subpixel PX1 and second subpixel PX2. The second insulating film 12 covers the common electrode CE. Note that elements which are not depicted here such as gate lines, source lines, and switching elements are formed between the first insulating substrate 10 and the first insulating film 11. A pixel electrode PE1 of the first subpixel PX1 and a pixel electrode PE2 of the second subpixel PX2 are formed on the second insulating film 12 to be opposed to the common electrode CE. Pixel electrodes PE1 and PE2 each have a slit SLA to be opposed to the common electrode CE. Pixel electrodes PE1 and PE2 are covered with a first alignment film AL1. The common electrode CE, and pixel electrodes PE1 and PE2 are formed of a transparent conductive material such as indium tin oxide or indium zinc oxide. Note that, in the example of FIG. 3, the display panel PNL of FFS mode in which pixel electrodes PE are formed on the common electrode CE is adopted; however, no limitation is intended thereby. The display panel PNL may be of FFS mode in which the common electrode CE is formed on the pixel electrodes PE. Furthermore, the present embodiment may be applied not only to a display panel of horizontal field modes such as FFS mode and IPS mode but also a display panel of vertical field mode.

The second substrate SUB2 includes a transparent second insulating substrate 20 which is formed of a glass substrate or a resin substrate. The second substrate SUB2 includes, on the surface of the second insulating substrate 20 opposed to the first substrate SUB1, light-shielding layer BM, color filters CFY and CFB, overcoat layer OC, and second alignment film AL2. The light shielding layer BM is formed on the inner surface of the second insulating substrate 20 to be opposed to the first substrate SUB1. The light shielding layer BM is formed of a black resin material or a light shielding metal material. Color filters CFY and CFB are formed on the inner surface of the second insulating substrate 20 to partly overlap the light shielding layer BM. Color filters CFY and CFB are opposed to pixel electrodes PE1 and PE2, respectively, with the liquid crystal layer LQ interposed therebetween. Color filter CFY is a yellow color filter which is formed of a yellow resin material. Color filter CFB is a blue color filter which is formed of a blue resin material. The overcoat layer OC covers color filters CFY and CFB. The overcoat layer OC is formed of a transparent resin material. The overcoat layer OC is covered with the second alignment film AL2. The first alignment film AL1 and the second alignment film AL2 are formed of a material indicative of the horizontal alignment.

The first substrate SUB1 and the second substrate SUB2 are adhered together with a certain cell gap is formed therebetween. The liquid crystal layer LQ is sealed between the first alignment film AL1 and the second alignment film AL2.

A first optical element OD1 including a first polarizer PL1 is disposed on the outer surface of the first substrate SUB1. A second optical element OD2 including a second polarizer PL2 is disposed on the outer surface of the second substrate SUB2.

Note that, in the example depicted, color filters CFY and CFB are formed on the second substrate SUB2; however, they may be formed on the first substrate SUB1. In the example depicted, color filters CFY and CFB may be replaced with the first insulating film 11 or may be disposed between the first insulating substrate 10 and the first insulating film 11.

FIG. 4 shows the structure of a light source element PC of FIG. 1.

In the example depicted, a light source element PC includes the first light emitting element L1 and the second light emitting element L2 in a main body BX. In the example depicted, the main body BX is formed as a rectangular parallelepiped. The light source element PC has a single exit surface A on the side B which is opposed to the side surface LGC of the lightguide plate LG of FIG. 1. The first light emitting element L1 and the second light emitting element 12 are, for example, light emitting diodes. The light emitted from each of the first light emitting element L1 and the second light emitting element L2 exits from the exit surface A.

Note that, in the example depicted, the light source element PC includes two light emitting elements; however, the number of light emitting elements may be three or more, and in either case, the light source element PC includes a single exit surface A.

Figure 5:
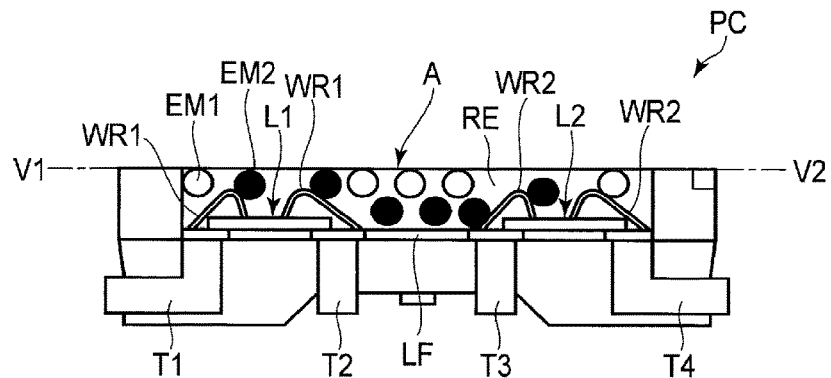
FIG. 5 is a schematic cross-sectional view of the light source element PC of FIG. 4.

FIG. 5 shows a schematic cross-sectional view of the light source element PC of FIG. 4. FIG. 5 shows the light source element PC, taken along line V1-V2 of FIG. 4.

The light source element PC includes a transparent resin RE which accommodates a lead frame LF, first light emitting element L1, second light emitting element L2, first wavelength conversion material EM1, and second wavelength conversion material EM2. In the example depicted, the light source element PC further includes four terminals T1 to T4.

The first light emitting element L1 is electrically connected to terminals T1 and T2 through wire WR1. The second light emitting element L2 is electrically connected to terminals T3 and T4 through wire WR2. Terminals T1 and T2 are electrically connected to the anode and cathode of the first light emitting element L1, respectively. Terminals T3 and T4 are electrically connected to the anode and cathode of the second light emitting element L2, respectively. Terminals T1 to T4 of each light source element PC are connected to four buslines formed on the flexible printed circuit LFPC of FIG. 1. Thus, the first light emitting element L1 and the second light emitting element L2 emit light separately in the light source element PC.

The first light emitting element L1 emits light of a first wavelength. The second light emitting element L2 emits light of a second wavelength. Note that, in this example, the first and second wavelengths are different wavelengths. In this example, the first and second wavelengths are the blue and ultraviolet wavelengths, respectively. Furthermore, the first and second wavelengths may be the same wavelength. In that case, both the first and second wavelengths may be the blue or ultraviolet wavelengths.

The first wavelength conversion material EM1 is excited by the light of the first wavelength emitted from the first light emitting element L1 to emit light of a third wavelength. The second wavelength conversion material EM2 is excited by the light of the second wavelength emitted from the second light emitting element L2 to emit light of a fourth wavelength which is different from the third wavelength. The first wavelength conversion materials EM1 and the second wavelength conversion materials EM2 are included in resin RE and are sealed in the light source element PC. The resin RE is a transparent resin material such as epoxy or silicone. The resin RE including the first wavelength conversion materials EM1 and the second wavelength conversion materials EM2 fills a space between the exit surface A and the first light emitting element L1 and second light emitting element L2. Thus, when the first light emitting element L1 emits light, the first wavelength conversion materials EM1 not only those are opposed to the first light emitting element L1 but also those are opposed to the second light emitting element L2 are excited, and light of a first color including at least the light of the third wavelength is emitted from the entirety of the exit surface A. Similarly, when the second light emitting element L2 emits light, the second wavelength conversion materials EM2 not only those are opposed to the second light emitting element L2 but also those are opposed to the first light emitting element L1 are excited, and light of a second color including at least the light of the fourth wavelength is emitted from the entirety of the exit surface A. That is, the light source element PC emits the light of the first color and the light of the second color from the exit surface A which is the same light emitting surface.

Both the third and fourth wavelengths are longer than the first and second wavelengths. In this example, the third and fourth wavelengths are the green and red wavelengths, respectively. Both the first wavelength conversion materials EM1 and the second wavelength conversion material EM2 are formed of, for example, a phosphor. For example, if a red phosphor is used as a wavelength conversion material which emits light of red wavelength, such a red phosphor may be composed of one or more phosphor groups such as $M_2O_2S$:Eu (where M is one or more elements selected from La, Gd, and Y); $0.5MgF_2 \cdot 3.5MgO \cdot GeO_2$:Mn; $YO_3$:Eu; $Y(P,V)O_4$:Eu; and $YVO_4$:Eu.

If a green phosphor is used as a wavelength conversion material which emits light of green wavelength, such a green phosphor may be composed of one or more phosphor groups such as $RMg_2AL_{16}O_{27}$:Eu, Mn (where R is either one or both of Sr and Ba); $RMgAl_{10}O_{17}$:Eu, Mn (where R is either one or both of Sr and Ba); ZnS:Cu; $SrAl_2O_4$:Eu; $SrAl_2O_4$:Eu, Dy; ZnO:Zn; $Zn_2Ge_2O_4$:Mn; $Zn_2SiO_4$:Mn; $Q_3MgSi_2O_8$:Eu, Mn (where Q is one or more elements selected from Sr, Ba, and Ca).

Note that the first wavelength conversion material EM1 and the second wavelength conversion material EM2 may be formed of a quantum dot. Furthermore, in addition to the first wavelength conversion materials EM1 and the second wavelength conversion materials EM2, the light source element PC may include third wavelength conversion materials for emitting light of fifth wavelength which is different from the third wavelength and fourth wavelength.

In the present embodiment, the light source element PC produces, for example, cyan light as a first color when the first light emitting element L1 and magenta light as a second color when the second light emitting element L2. Furthermore, the light source element PC may produce white light when the first light emitting element L1 and the second light emitting element L2 emit light at the same time. Such white light is emitted from the exit surface A which is a light emitting surface. Note that a combination of the first and second colors is not limited to the above example. Furthermore, the first and second colors may be produced as a combination of light emitted from a light emitting element and light emitted from wavelength conversion materials, or as a combination of light of different colors emitted from different wavelength conversion materials.

Figure 6:
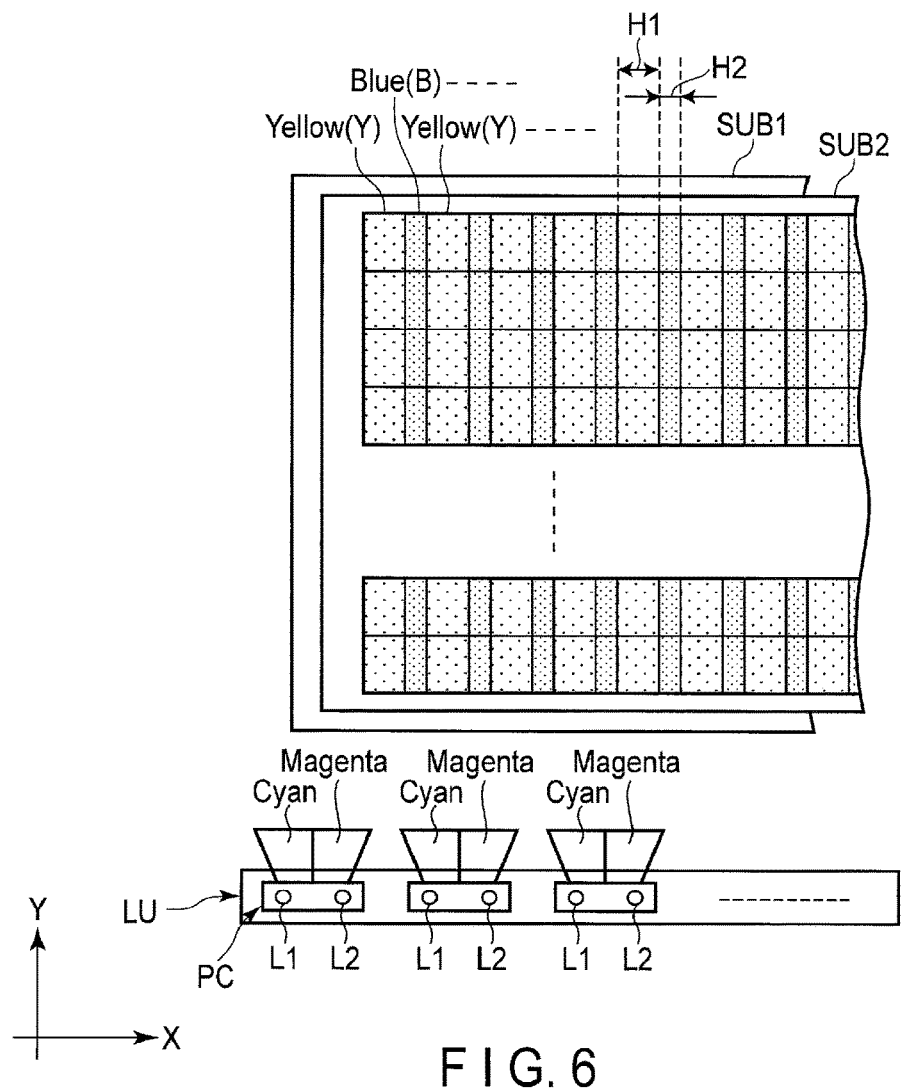
FIG. 6 shows an example of the color of light from a light source unit LU and arrangement of color filters.

FIG. 6 shows an example of the color of light from the light source unit LU and the arrangement of color filters. In FIG. 6, some structures such as source lines in the first substrate SUB1 side are omitted for the sake of easier understanding of the arrangement of color filters.

Blue color filters having width H2 and yellow color filters having width H1 are arranged alternately in the first direction X. The display device of the present embodiment adopts the field sequential drive. In the example of FIG. 6, the light source units LU emit cyan light as a first color when the first light emitting elements L1 emit light and emit magenta light as a second color when the second light emitting elements L2 emit light. In this drive technique, each first light emitting element L1 turns on in the first half of a single frame and turns off in the other half of the frame. On the other hand, each second light emitting element L2 turns off in the first half of a single frame and turns on in the other half of the frame.

As shown in FIG. 1, the light source elements PC are arranged parallel to a short side of the lightguide plate LG. The light from the light source elements PC enters the lightguide plate LG and the light exiting the lightguide plate LG passes the light transmissive pixels. Thus, in the field sequential drive of the display device of the present embodiment, the emission of cyan light and magenta light is repeated periodically.

FIG. 7 shows a relationship between the color of light emitted from the backlight unit BL and the colors of the light from the color filters CFY and CFB in a pixel. In the example depicted, a frame period for the color image display includes two fields of a cyan field Cy and a magenta field Ma. The cyan field Cy and the magenta field Ma each correspond to a half frame period.

The backlight unit BL emits cyan light in the cyan field Cy and magenta light in the magenta field Ma. In the cyan field Cy, the first subpixel PX1 including a yellow color filter CFY displays green, and the second subpixel PX2 including a blue color filter CFB displays blue. In the magenta field Ma, the first subpixel PX1 displays red, and the second subpixel PX2 displays blue. That is, blue can be displayed in both the cyan field Cy and the magenta field Ma, red can be displayed in the magenta field Ma, and green can be displayed in the cyan field Cy. Therefore, the intensity of blue tends to be stronger as compared to the intensity of red and green.

In the present embodiment, the area of the first subpixels PX1 with yellow color filters is formed greater than the area of the second subpixels PX2 with blue color filters. With this structure, the intensities of blue, green, and red are made substantially equal in a frame period.

Note that, to obtain a good white balance, the intensities of blue, green, and red may not necessarily be made even. The intensities of blue, green, and red, or the area of each of the first subpixel PX1 and the second subpixel PX2 should be designed in consideration of the characteristics of each color filter such as transmissivity and hue to obtain a desired white balance on a chromaticity diagram.

FIG. 8 shows an example of drive of the first light emitting element L1 and the second light emitting element L2, and color displayed by the display device.

In the cyan field Cy, the first light emitting element L1 is turned on and the second light emitting element L2 is turned off. Thereby, the backlight unit BL emits cyan light. At that time, the light passing through the color filter CFY becomes green light G1 and the light passing through the color filter CFB becomes blue light B1. In the example depicted, the intensity of blue light B1 is made approximately half the intensity of green light G1.

In magenta field Ma, the second light emitting element L2 is turned on and the first light emitting element L1 is turned off. Thereby, the backlight unit BL emits magenta light. At that time, the light passing through the color filter CFY becomes red light R2 and the light passing through the color filter CFB becomes blue light B2. In the example depicted, the intensity of blue light B2 is made approximately half the intensity of red light R2.

That is, in a single frame period, each of blue light B1, blue light B2, green light G1, and red light R2 can be recognized.

In the above example, one frame period includes two fields. Now, an example in which one frame period includes three fields will be explained.

Figure 9:
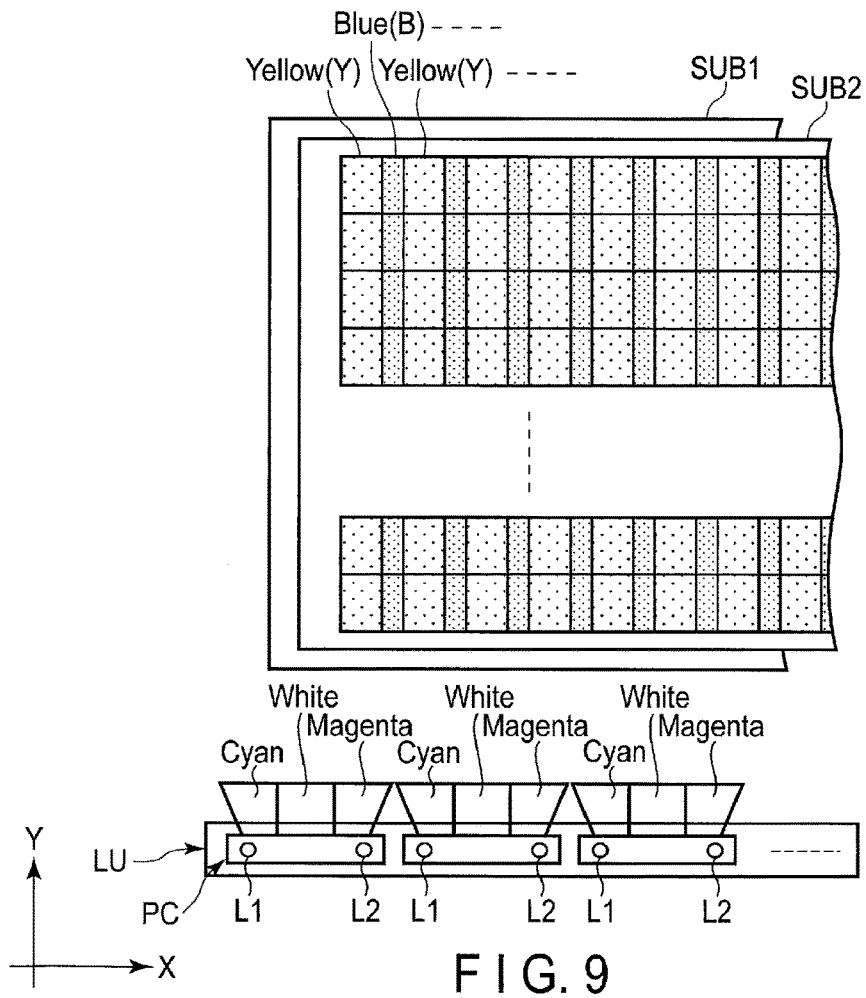
FIG. 9 shows another example of color of light from the light source unit LU and arrangement of color filters.

FIG. 9 shows an example of the color of light from the light source unit LU and the arrangement of color filters. As compared to the example of FIG. 6, the light source unit LU emits cyan light, white light, and magenta light periodically in a single frame in the example of FIG. 9. That is, the light source unit LU emits cyan light when the first light emitting element L1 emits light, and magenta light when the second light emitting element L2 emits light, and white light when the first light emitting element L1 and the second light emitting element L2 at the same time.

Figure 10:
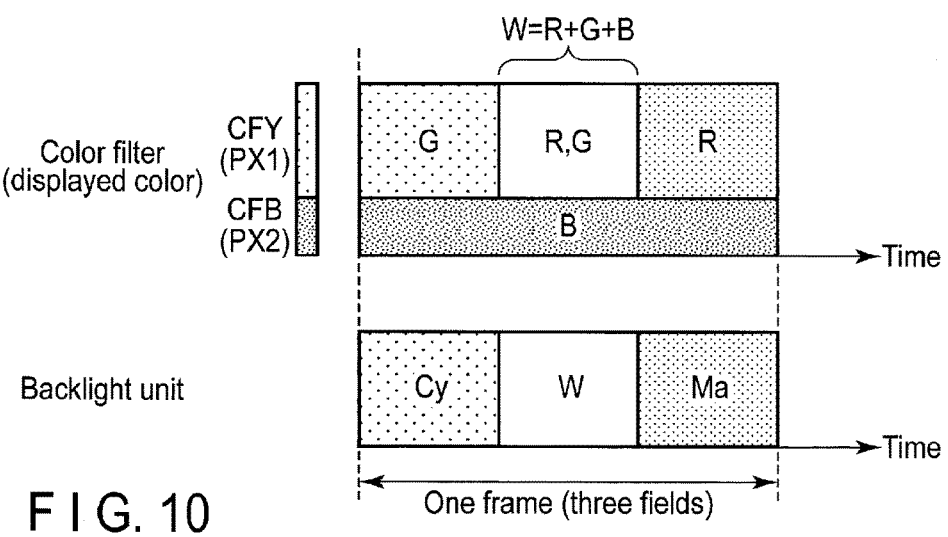
FIG. 10 shows another relationship between the color of light from the backlight unit BL and colors of light from color filters CFY and CFB in a pixel.

FIG. 10 shows a relationship between the color of light emitted from the backlight unit BL and the colors of the light from the color filters CFY and CFB in a pixel. In the example depicted, a frame period for the color image display includes three fields: a cyan field Cy, a white field W, and a magenta field Ma. The cyan field Cy, white field W, and magenta field Ma each correspond to a one-third frame period.

The backlight unit BL emits cyan light in the cyan field Cy, white light in the white field W, and magenta light in the magenta field Ma. In the cyan field Cy, the first subpixel PX1 including a yellow color filter CFY displays green, and the second subpixel PX2 including a blue color filter CFB displays blue. In the white field W, the first subpixel PX1 displays yellow of a mixture of red and green, and the second subpixel PX2 displays blue. In the magenta field Ma, the first subpixel PX1 displays red, and the second subpixel PX2 displays blue. That is, blue can be displayed in all of the cyan field Cy, white field W, and magenta field Ma; red can be displayed in the white field W and magenta field Ma; and green can be displayed in the white field W and cyan field Cy. As in the example of FIG. 7, the area of the first subpixels PX1 with yellow color filters is formed greater than the area of the second subpixels PX2 with blue color filters, and thus, the intensities of blue, green, and red are made substantially equal in a frame period.

FIG. 11 shows another example of the drive of the first light emitting element L1 and the second light emitting element L2 and the color displayed by the display device. The first light emitting element L1 is, for example, driven to be turned on in the first two-thirds of a frame and to be turned off in the latter one-third. On the other hand, the second light emitting element L2 is driven to be turned off in the first one-third of a frame and to be turned on in the latter two-thirds.

In the cyan field Cy, the first light emitting element L1 is turned on and the second light emitting element L2 is turned off. Thereby, the backlight unit EL emits cyan light. At that time, the light passing through the color filter CFY becomes green light G1 and the light passing through the color filter CFB becomes blue light B1. In the example depicted, the intensity of blue light B1 is made approximately half the intensity of green light G1.

In the white field W, the first light emitting element L1 and the second light emitting element L2 are both turned on. Thereby, the backlight unit BL emits white light. At that time, the light passing through the color filter CFY becomes green light G2 and red light R2 and the light passing through the color filter CFB becomes blue light B2. In the example depicted, the intensities of the blue light B2, green light G2, and red light R2 become substantially equal.

In the magenta field Ma, the second light emitting element L2 is turned on and the first light emitting element L1 is turned off. Thereby, the backlight unit BL emits magenta light. At that time, the light passing through the color filter CFY becomes red light R3 and the light passing through the color filter CFB becomes blue light B3. In the example depicted, the intensity of blue light B3 is made approximately half the intensity of red light R3.

That is, in a single frame period, each of blue light B1, B2, and B3, green light G1 and G2, and red light R2 and R3 can be recognized.

In the above examples, a frame period includes two or three fields, and in some cases, a frame period may include four or more fields. Furthermore, a combination of colors of three fields is not limited to the above example.

In the present embodiment, a light source element PC includes a first light emitting element L1 and a second light emitting element L2, and first wavelength conversion materials EM1 and second wavelength conversion materials EM2, where cyan light produced when the first light emitting element L1 emits light and magenta light produced when the second light emitting element L2 emits light are emitted from the same light emitting surface (in the above example, from the exit surface A of the light source element PC). Therefore, as compared to a case where a spot light source of cyan and a spot light source of magenta are provided separately, cyan light and magenta light can be mixed in the position closer to the light source element PC, and uneven mixture of colors can be prevented.

Furthermore, uneven mixture of colors can be prevented in the proximity of the incident surface (in the above example, the side surface LGC) of the lightguide plate LG opposed to the light source elements PC. Thus, the area in the proximity of the incident surface of the lightguide plate LG can be used as an effective area for illuminating the display panel PNL. Furthermore, by placing the effective area opposed to the display area DA of the display panel PNL, uneven mixture of colors in the display area DA can be prevented and the deterioration in the display quality can be prevented, too.

Furthermore, the light source elements PC can be disposed in the proximity of the lightguide plate without causing uneven mixture of colors. Therefore, light from the light source elements PC can be efficiently guided into the lightguide plate LG, and the efficiency of the light use can be improved. Furthermore, a gap between the light source elements PC and the lightguide plate LG can be reduced, and the display device can be manufactured with a thinner bezel structure.

Furthermore, in the present embodiment, the field sequential drive is adopted to illuminate the display panel PNL. Thus, one light emitting element of a light source element is turned on in the cyan field and the other light emitting element of the light source element is turned on in the magenta field. In other words, two light emitting elements of the light source element are not constantly turned on in a single frame period. Therefore, the power for drive can be reduced.

Now, a variation of the present embodiment will be explained.

Figure 12:
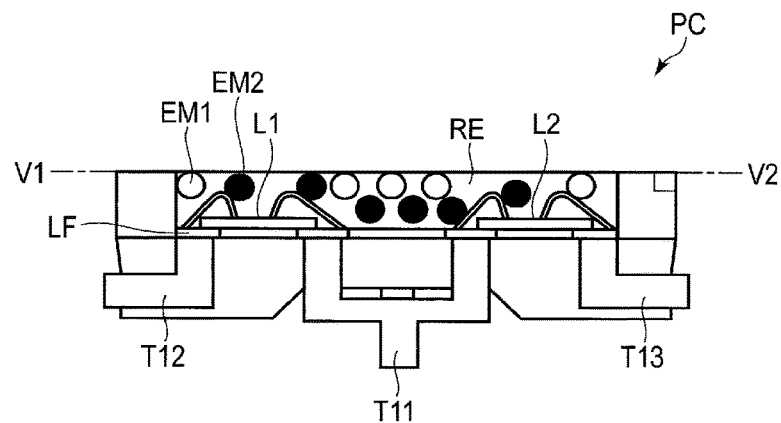
FIG. 12 is a schematic cross-sectional view of the light source element PC of FIG. 4.

FIG. 12 is another schematic cross-sectional view of the light source element PC of FIG. 4. As compared to the example of FIG. 5, the light source element PC includes three terminals T11 to T13 as compared to the example of FIG. 12.

The first light emitting element L1 is electrically connected to terminals T11 and T12 through wire WR1. The second light emitting element L2 is electrically connected to terminals T11 and T13 through wire WR2. Terminal T11 is a single common terminal which electrically connects the first light emitting element L1 and the second light emitting element L2. In this example, terminal T11 is electrically connected to the anode of each of the first light emitting element L1 and the second light emitting element L2. Terminal T12 is electrically connected to the cathode of the first light emitting element L1, and terminal T13 is electrically connected to the cathode of the second light emitting element L2. Note that terminal T11 may be electrically connected to the cathode of each of the first light emitting element L1 and the second light emitting element L2, and in that case, terminals T12 and T13 are electrically connected to the anodes of the first light emitting element L1 and the second light emitting element L2, respectively.

In this variation, as in the above example, the first light emitting element L1 and the second light emitting element L2 emit light separately. In addition to this point, as compared to the example of FIG. 5 in which the light source element PC includes four terminals, the number of buslines formed on the flexible printed circuit LFPC can be reduced to three. Thus, the size of the flexible printed circuit LFPC can be reduced.

Figure 13:
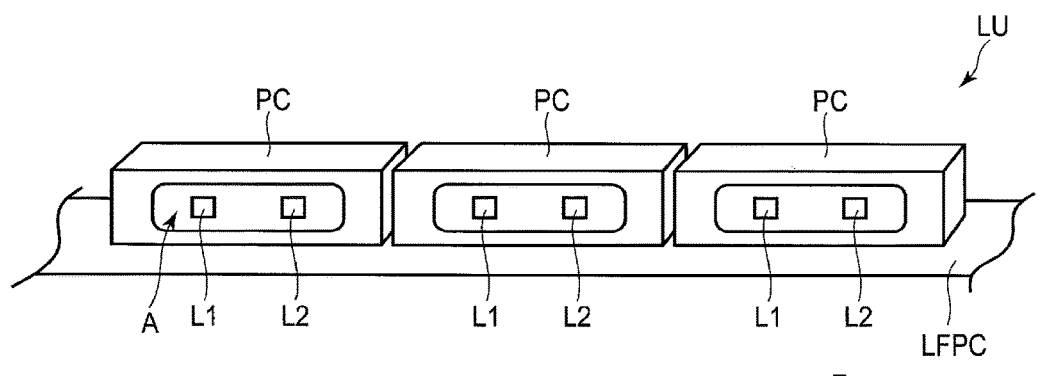
FIG. 13 shows an example of the arrangement of light source elements PC.
Figure 13:
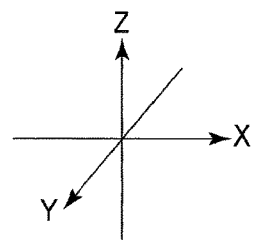

FIG. 13 shows an example of the arrangement of light source elements PC. In this example, a third direction Z is orthogonal to both the first direction X and the second direction Y.

Light source elements PC are mounted in line on the flexible printed circuit in the first direction X. The exit surface A of each light source element PC is formed in a rectangle whose long sides extend in the first direction X. In each light source element PC, the first light emitting element L1 and the second light emitting element L2 are arranged side-by-side in the first direction X. The number of light source elements PC mounted on the flexible printed circuit LFPC and the gap between the light source elements PC can be determined arbitrarily based on the desired intensity of light.

The first light emitting elements L1 in the light source elements PC are connected in series. Furthermore, the second light emitting elements L2 in the light source elements PC are connected in series. That is, the light emitting diodes of the same color are lit at the same time.

Figure 14:
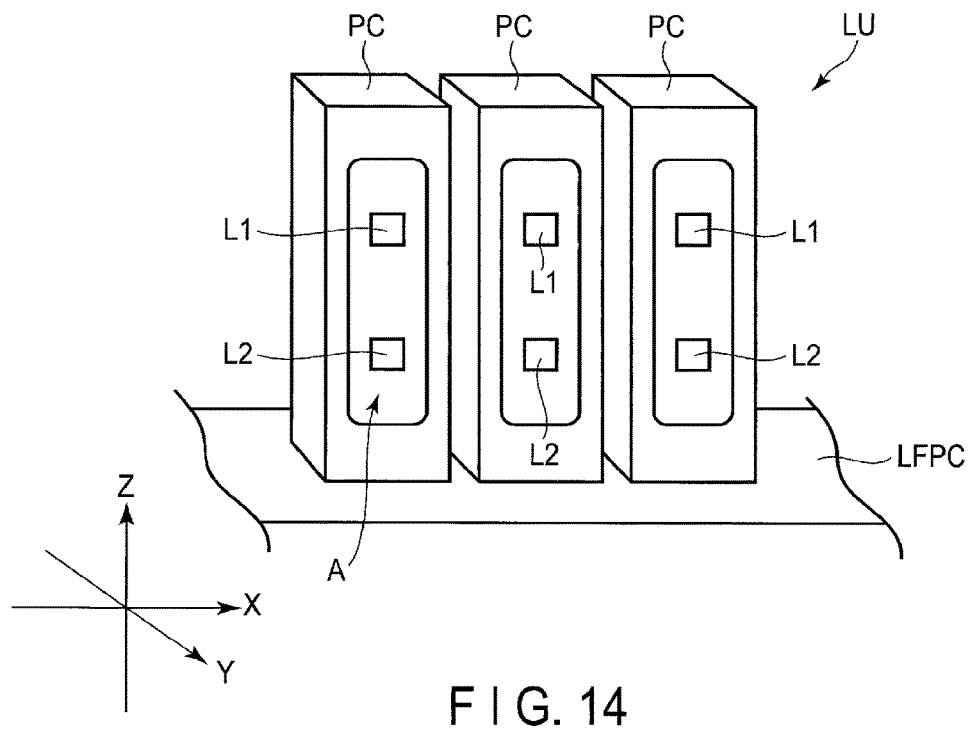
FIG. 14 shows another example of the arrangement of light source elements PC in the light source unit LU.

FIG. 14 shows another example of the arrangement of the light source elements PC in the light source unit LU. As compared to the example of FIG. 13, the first light emitting elements L1 and the second light emitting elements L2 of the light source elements PC are arranged in the third direction Z in the example of FIG. 14.

In this arrangement, the first light emitting elements L1 emit light at the same position in the X-Y plane and the second light emitting elements L2 emit light at the same position in the X-Y plane. Thus, uneven mixture of colors of the first light emitting elements L1 and the second light emitting elements L2 can be further suppressed.

Figure 15:
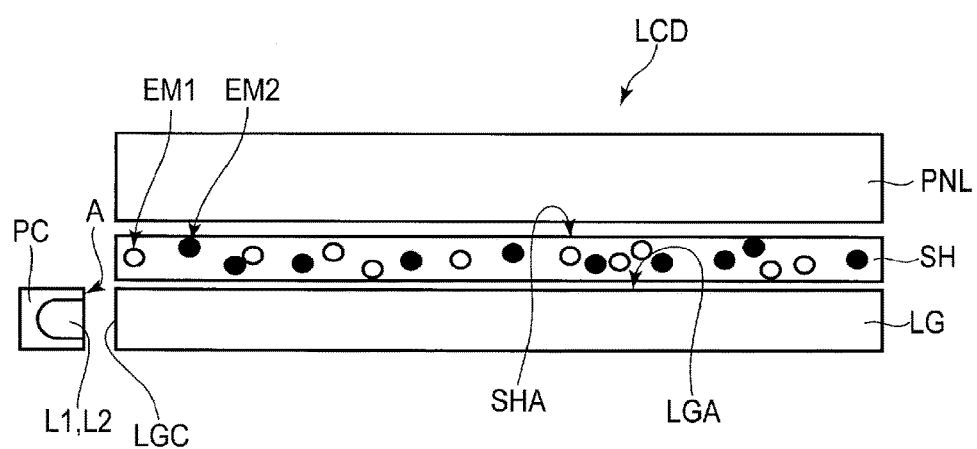
FIG. 15 shows another example of the structure of the present embodiment.

FIG. 15 shows another example of the structure of the present embodiment. In the example of FIG. 15, the display device LCD includes a light source element PC, lightguide plate LG, sheet SH, and display panel PNL. The light source element PC includes an exit surface A which is opposed to the side surface (incident surface) LGC of the lightguide plate LG. The display panel PNL is opposed to the main surface (exit surface) LGA of the lightguide plate LG. The sheet SH is disposed between the lightguide plate LG and the display panel PNL.

As in the above example, each light source element PC includes the first light emitting element L1 and the second light emitting element L2. The light from the first light emitting element L1 and the second light emitting element L2 is emitted from the exit surface A of the light source element PC. Note that, in this example, the light source element PC does not include first wavelength conversion materials or second wavelength conversion materials which are included in the light source element PC of the above embodiment. Instead, first wavelength conversion materials EM1 and second wavelength conversion materials EM2 are sealed in the sheet SH.

The light of the first wavelength emitted from the first light emitting element L1 exits the exit surface A of the light source element PC, passes the lightguide plate LG, and reaches the sheet SH to excite the first wavelength conversion materials EM1 therein. Thus, the light of the first color (such as cyan) including at least the light of the third wavelength is emitted from the sheet SH when the first light emitting element L1 emits light. The light of the second wavelength from the second light emitting element L2 exits the exit surface A of the light source element PC, passes the lightguide plate LG, and reaches the sheet SH to excite the second wavelength conversion materials EM2 therein. Thus, the light of the second color (such as magenta) including at least the light of the fourth wavelength is emitted from the sheet SH when the second light emitting element L2 emits light. The light of the first color and the light of the second color are emitted from the same light emitting surface. In the example depicted, the light emitting surface is the main surface SHA of the sheet SH, which is opposed to the display panel PNL.

The advantages described in the above examples can be achieved in this example, too. Note that, the sheet SH may be replaced with any one in the optical sheet OS of FIG. 1. That is, the first wavelength conversion materials EM1 and the second wavelength conversion materials EM2 may be sealed in one component of the optical sheet OS. In that case, the number of items can be reduced, and the thickness of the display device LCD can be decreased.

Figure 16:
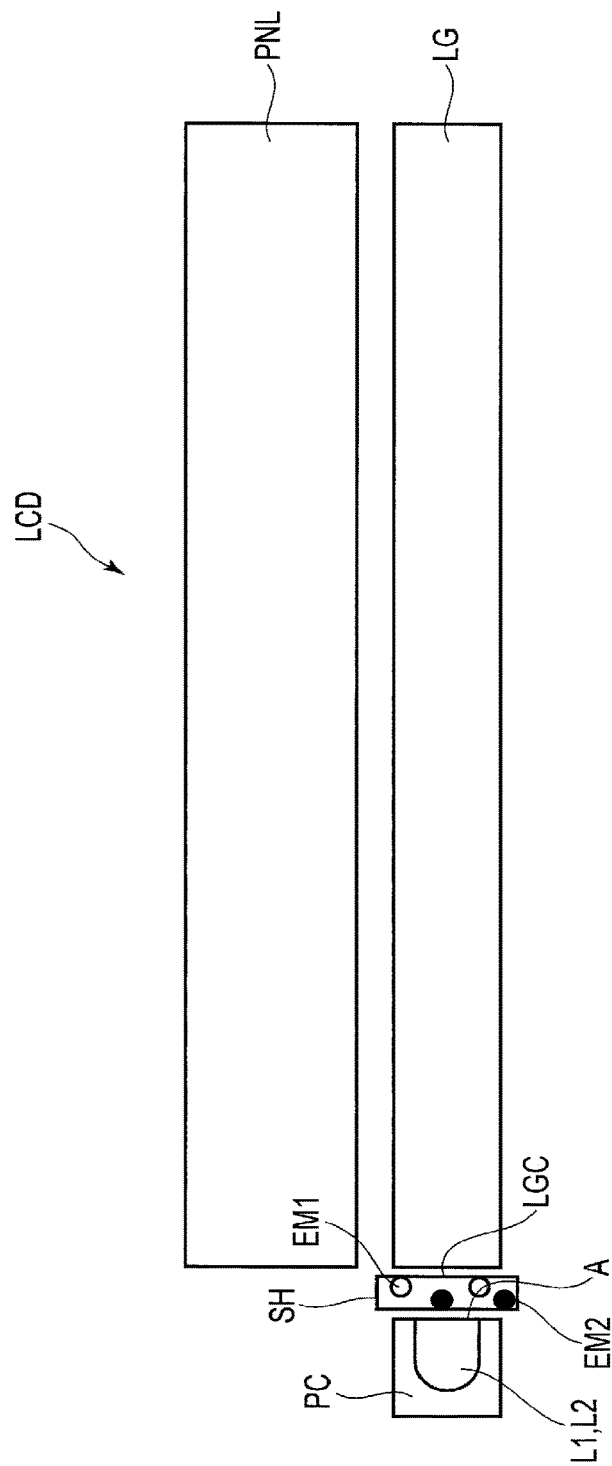
FIG. 16 shows another example of the structure of the present embodiment.

FIG. 16 shows another example of the structure of the present embodiment. As compared to the example of FIG. 15, the sheet SH is disposed in a different position in the example of FIG. 16. As in the example of FIG. 15, the sheet SH includes the first wavelength conversion materials EM1 and second wavelength conversion materials EM2. In the example depicted, the sheet SH is interposed between the light source element PC and the lightguide plate LG.

The advantages described in the above examples can be achieved in this example, too. In addition, as compared to the example of FIG. 15, the size of the sheet SH can further be reduced.

As can be understood from the above, embodiments of the present application can provide a display device and a light source device which can achieve less power consumption and less deterioration in display quality.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Some examples of the light source device and the display device of the present embodiment will be noted here.

(1) A light source device comprising:

a light source element including a first light emitting element which emits light of a first wavelength and a second light emitting element which emits light of a second wavelength;

a first wavelength conversion material which is excited by the light from the first light emitting element to emit light of a third wavelength; and a second wavelength conversion material which is excited by the light from the second light emitting element to emit light of a fourth wavelength, wherein cyan light produced by the light emission of the first light emitting element and magenta light produced by the light emission of the second light emitting element are emitted from the same light emitting surface.

(2) The light source device according to (1), wherein the light source element includes the first wavelength conversion material and the second wavelength conversion material, and the light emitting surface is formed on an exit surface of the light source element.

(3) The light source device according to (1), comprising a sheet including the first wavelength conversion material and the second wavelength conversion material, wherein the light emitting surface is formed on a main surface of the sheet.

(4) The light source device according to (1), wherein the first wavelength conversion material and the second wavelength conversion material include a phosphor or a quantum dot.

(5) The light source device according to (1), wherein white light produced when both the first light emitting element and the second light emitting element emit light at the same time is emitted from the light emitting surface.

(6) The light source device according to (1), wherein the light source element includes four terminals connected to an anode and a cathode of each of the first light emitting element and the second light emitting element.

(7) The light source device according to (1), wherein the light source element includes a common terminal which electrically connects the first light emitting element and the second light emitting element and two terminals electrically connected to anodes or cathodes of each of the first light emitting element and the second light emitting element.

(8) The light source device according to (1), wherein the second wavelength is different from the first wavelength.

(9) A display device comprising:
a display panel;
a light source element including a first light emitting element which emits light of a first wavelength and a second light emitting element which emits light of a second wavelength;
a lightguide plate including an incident surface which is opposed to the light source element and an exit surface which is opposed to the display panel;
a first wavelength conversion material which is excited by the light from the first light emitting element to emit light of a third wavelength; and
a second wavelength conversion material which is excited by the light from the second light emitting element to emit light of a fourth wavelength, wherein
cyan light produced by the light emission of the first light emitting element and magenta light produced by the light emission of the second light emitting element are emitted from the same light emitting surface to illuminate the display panel.

(10) The display device according to (9), wherein the light source element includes the first wavelength conversion material and the second wavelength conversion material, and
the light emitting surface is formed on the exit surface of the light source element.

(11) The display device according to (9), comprising a sheet including the first wavelength conversion material and the second wavelength conversion material, and
the light emitting surface is formed on a main surface of the sheet.

(12) The display device according to (11), wherein the sheet is disposed between the display panel and the lightguide plate.

(13) The display device according to (11), wherein the sheet is disposed between the light source element and the lightguide plate.

(14) The display device according to (9), wherein the display panel further includes a first subpixel including a yellow color filter and a second subpixel including a blue color filter.

(15) A light source device comprising:
a light source element including a first light emitting element which emits light of a first wavelength and a second light emitting element which emits light of a second wavelength;
a first wavelength conversion material which is excited by the light from the first light emitting element to emit light of a third wavelength; and
a second wavelength conversion material which is excited by the light from the second light emitting element to emit light of a fourth wavelength, wherein
light of a first color including at least the light of the third wavelength which is produced by the light emission of the first light emitting element and light of a second color including at least the light of the fourth wavelength which is produced by the light emission of the second light emitting element are emitted from the same light emitting surface.

(16) The light source device according to (15), wherein the light source element includes the first wavelength conversion material and the second wavelength conversion material, and
the light emitting surface is formed on an exit surface of the light source element.

(17) The light source device according to (15), comprising a sheet including the first wavelength conversion material and the second wavelength conversion material are sealed, wherein
the light emitting surface is formed on a main surface of the sheet.

(18) The light source device according to (15), wherein the first wavelength conversion material and the second wavelength conversion material include a phosphor or a quantum dot.

(19) The light source device according to (15), wherein white light produced when both the first light emitting element and the second light emitting element emit light at the same time is emitted from the light emitting surface.

(20) The light source device according to (15), wherein the second wavelength is different from the first wavelength.

(21) The light source device according to (15), wherein the light source element includes four terminals connected to an anode and a cathode of each of the first light emitting element and the second light emitting element.

(22) The light source device according to (15), wherein the light source element includes a common terminal which electrically connects the first light emitting element and the second light emitting element and two terminals electrically connected to anodes or cathodes of each of the first light emitting element and the second light emitting element.

What is claimed is:
1. A light source device comprising:
a light source element including a first light emitting element which emits light of a first wavelength and a second light emitting element which emits light of a second wavelength;
the light source element including a first wavelength conversion material which is excited by the light from the first light emitting element to emit light of a third wavelength and a second wavelength conversion material which is excited by the light from the second light emitting element to emit light of a fourth wavelength, wherein
cyan light produced by the light emission of the first light emitting element and magenta light produced by the light emission of the second light emitting element are emitted from the same light emitting surface,
the first light emitting element and the second light emitting element are sealed in a single space in the light source element,
the first wavelength conversion material and the second wavelength conversion material are mixed and sealed in the single space in the light source element,
the light from the first light emitting element and the light from the second light emitting element are emitted from the light emitting surface through the single space in which the first wavelength conversion material and the second wavelength conversion material are mixed.
2. The light source device according to claim 1, wherein the first wavelength conversion material and the second wavelength conversion material include a phosphor or a quantum dot.

3. The light source device according to claim 1, wherein white light produced when both the first light emitting element and the second light emitting element emit light at the same time is emitted from the light emitting surface.

4. The light source device according to claim 1, wherein the light source element includes four terminals connected to an anode and a cathode of each of the first light emitting element and the second light emitting element.

5. The light source device according to claim 1, wherein the light source element includes a common terminal which electrically connects the first light emitting element and the second light emitting element and two terminals electrically connected to anodes or cathodes of each of the first light emitting element and the second light emitting element.

6. The light source device according to claim 1, wherein the second wavelength is different from the first wavelength.

7. A display device comprising:
a display panel;
a light source element including a first light emitting element which emits light of a first wavelength and a second light emitting element which emits light of a second wavelength;
a lightguide plate including an incident surface which is opposed to the light source element and an exit surface which is opposed to the display panel;
the light source element including a first wavelength conversion material which is excited by the light from the first light emitting element to emit light of a third wavelength and a second wavelength conversion material which is excited by the light from the second light emitting element to emit light of a fourth wavelength, wherein
cyan light produced by the light emission of the first light emitting element and magenta light produced by the light emission of the second light emitting element are emitted from the same light emitting surface to illuminate the display panel,
the first light emitting element and the second light emitting element are sealed in a single space in the light source element,
the first wavelength conversion material and the second wavelength conversion material are mixed and sealed in the single space in the light source element,
the light from the first light emitting element and the light from the second light emitting element are emitted from the light emitting surface through the single space in which the first wavelength conversion material and the second wavelength conversion material are mixed.

8. The display device according to claim 7, wherein the display panel further includes a first subpixel including a yellow color filter and a second subpixel including a blue color filter.

9. A light source device comprising:
a light source element including a first light emitting element which emits light of a first wavelength and a second light emitting element which emits light of a second wavelength;
the light source element including a first wavelength conversion material which is excited by the light from the first light emitting element to emit light of a third wavelength and a second wavelength conversion material which is excited by the light from the second light emitting element to emit light of a fourth wavelength, wherein
light of a first color including at least the light of the third wavelength which is produced by the light emission of the first light emitting element and light of a second color including at least the light of the fourth wavelength which is produced by the light emission of the second light emitting element are emitted from the same light emitting surface,
the first light emitting element and the second light emitting element are sealed in a single space in the light source element,
the first wavelength conversion material and the second wavelength conversion material are mixed and sealed in the single space in the light source element,
the light from the first light emitting element and the light from the second light emitting element are emitted from the light emitting surface through the single space in which the first wavelength conversion material and the second wavelength conversion material are mixed.

10. The light source device according to claim 9, wherein the first wavelength conversion material and the second wavelength conversion material include a phosphor or a quantum dot.

11. The light source device according to claim 9, wherein white light produced when both the first light emitting element and the second light emitting element emit light at the same time is emitted from the light emitting surface.

12. The light source device according to claim 9, wherein the second wavelength is different from the first wavelength.

13. The light source device according to claim 9, wherein the light source element includes four terminals connected to an anode and a cathode of each of the first light emitting element and the second light emitting element.

14. The light source device according to claim 9, wherein the light source element includes a common terminal which electrically connects the first light emitting element and the second light emitting element and two terminals electrically connected to anodes or cathodes of each of the first light emitting element and the second light emitting element.

* * * * *